P. O'Brian.
Brush Handle.

Nº 78,121.        Patented May 19, 1868.

WITNESSES:
R. J. Turner
Wm Gilman

INVENTOR:
P. O'Brian
by C. F. Wilson
attorney

United States Patent Office.

P. O'BRIAN, OF PHILADELPHIA, PENNSYLVANIA.

Letters Patent No. 78,121, dated May 19, 1868.

IMPROVED MOP AND SCRUBBING-BRUSH HOLDER.

*The Schedule referred to in these Letters Patent and making part of the same.*

TO WHOM IT MAY CONCERN:

Be it known that I, P. O'BRIAN, of Philadelphia, county of Philadelphia, and State of Pennsylvania, have made new and useful Improvements in Mop-Heads and Scrubbing-Brush Holders; and I hereby declare the following to be a full and exact description of the same, reference being had to the drawings that accompany and form a part of these specifications.

The object of my invention is to provide an implement by which scrubbing-brushes of different sizes may be held, and also one that can be used for a mop-head when desired.

Figure 1:
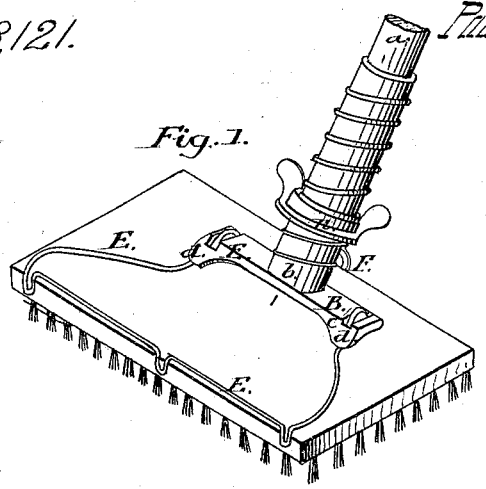

Figure 1 is a view showing manner of holding a brush.

Figure 2:
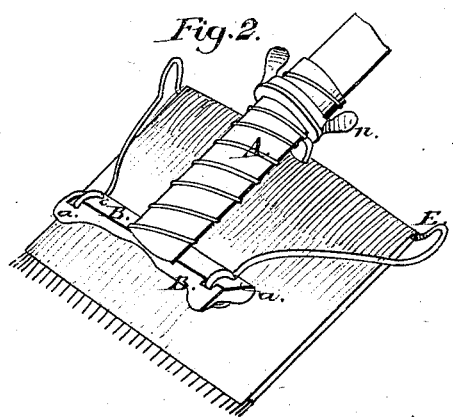

Figure 2, view, with mop as used.

Figure 3:
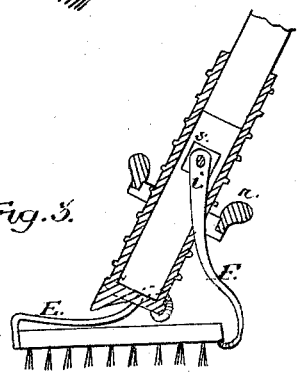

Figure 3, sectional view on a line, $a\ b$, showing how the tongue is fastened.

Letter A, shank, made of cast iron or other suitable metal, with a coarse screw-thread upon its external surface, having a nut, $n$, working loosely upon it. This shank is hollow, and has arms or a cross-bar, B, at its lower end. This cross-bar has openings, $c\ c$, near each end, and above them projections $d\ d$, curved downwards, for the purposes hereafter specified.

E is a heavy wire, bent in the form shown in the drawings, or any suitable shape, so that it forms a swinging clamp, to hold one side of the brush, and also the mop-cloth, when desired, as shown in fig. 2. The ends of the swinging clamp E pass through the openings $c$ in the cross-bar, and are bent around, forming a hinge, which allows it to swing underneath till it comes into the position shown in fig. 2, to hold the mop. The projections $d\ d$ form stops or bearings for the swinging clamp E, when holding the brush, or when in the position shown in fig. 1.

A slot is made in the under side of the shank A, extending from the bar B about half the length of the shank. In this slot is placed a tongue or hook, F, which clasps the brush on the opposite side from the swinging clamp E. The hook F is secured in the shank by a pin passing through it, as shown in fig. 3, at $i$. Shoulders formed upon the inside of the shank, being on each side of the tongue, as shown in fig. 3, at $s$, prevent any lateral motion of the same, which is let down when the holder is used for a brush, as is shown in fig. 3, or is thrown back, and clasps on the "swinging clamp" E, which is also turned back towards and against the handle, when used to hold the mop, as shown in fig. 2.

With this device brushes of various sizes may be held, by screwing the nut $n$ down against the tongue till the swinging clamp E and hook F come in contact with the brush. When used with a mop-cloth, it may be held in the position shown in fig. 2, this being the best for hard scrubbing, as in that position it has a firm bearing on the shank.

Hook F, being secured as stated, may be thrown entirely back, as shown in fig. 2. Still, the nut N has free play, which, turned down against the hook, securely holds the mop or brush, as the case may be.

What I claim, and desire to secure by Letters Patent, is—

1. Cross-bar B, cast on shank A, with openings $c\ c$, and projections $d\ d$, for the use and purpose as specified and herein set forth.

2. The swinging clamp E, made of wire or other material, in the shape shown, and for the use and purpose as specified and herein set forth.

3. A "mop and brush-holder," constructed of shank A, cross-bar B, nut N, swinging clamp E, and hook F, as connected, combined, and adjusted, for the use and purpose specified and herein set forth.

In testimony whereof, I have signed my name to this specification in the presence of two subscribing witnesses.

P. O'BRIAN.

Witnesses:
R. S. TURNER,
EDM. F. BROWN.